United States Patent [19]

Chadha

[11] Patent Number: 5,007,697

[45] Date of Patent: Apr. 16, 1991

[54] FIBRE OPTIC DATA COUPLER

[75] Inventor: Rajan Chadha, Glasgow, Scotland

[73] Assignee: The British Petroleum Company, plc, London, England

[21] Appl. No.: 392,755

[22] Filed: Aug. 11, 1989

[30] Foreign Application Priority Data

Aug. 17, 1988 [GB] United Kingdom ............... 8819574

[51] Int. Cl.$^5$ ............................ G02B 6/26; G02F 1/00
[52] U.S. Cl. .............................. 350/96.15; 350/96.16; 350/96.20; 455/601; 455/606; 455/608; 455/612; 455/613
[58] Field of Search ............... 350/96.10, 96.15, 96.16, 350/96.20, 96.21; 455/601, 602, 606, 608, 610, 612, 613, 617; 174/70 R, 70 S

[56] References Cited

U.S. PATENT DOCUMENTS

| | | | |
|---|---|---|---|
| 3,319,080 | 5/1967 | Cornely et al. ............... | 455/601 X |
| 4,276,656 | 6/1981 | Petryk, Jr. .................... | 350/96.16 X |
| 4,295,225 | 10/1981 | Pan ................................ | 455/601 |
| 4,319,203 | 3/1982 | Brosio et al. ................ | 372/30 |
| 4,662,002 | 4/1987 | Davis et al. .................. | 455/601 |
| 4,679,250 | 7/1987 | Davis et al. .................. | 455/601 |
| 4,680,809 | 7/1987 | Hartkopf et al. ............. | 455/601 |
| 4,688,260 | 8/1987 | Shutterly et al. ............ | 455/601 |
| 4,761,831 | 8/1988 | Davis et al. .................. | 455/601 X |
| 4,832,433 | 5/1989 | de La Chapelle et al. ... | 350/96.15 |
| 4,837,856 | 6/1989 | Glista, Jr. ..................... | 455/601 |

Primary Examiner—Brian Healy
Attorney, Agent, or Firm—Larry W. Evans; Joseph G. Curatolo

[57] ABSTRACT

A fibre optic data coupler comprises (a) a fibre optic data link input module comprising an input connector for a fibre optic connected to a fibre optic receiver for providing a digital electrical output signal corresponding to the fibre optic signal, (b) a coupler drive module for converting the digital electrical output signal to an analogue drive signal for input to an inductive coupler, (c) an inductive coupler unit comprising an inlet element for receiving the analogue drive signal and an outlet element for transmitting an induced analogue drive signal, corresponding to the input signal, (d) a coupler output module for converting the induced analogue drive signal to a digital electrical output signal for input to a fibre optic data link output module, and (e) a fibre optic data link output module comprising a fibre optic transmitter module, for providing a fibre optic signal corresponding to the digital electrical input signal, connected to a connector for a fibre optic. The coupler is particularly suitable for use in subsea applications in association with a power cable.

10 Claims, 2 Drawing Sheets

FIBRE OPTIC DATA COUPLER

BACKGROUND OF THE INVENTION

This invention relates to a fibre optic data coupler suitable for use in subsea applications.

At present, signal cables for subsea use are electrical and employ inductive or plug and socket connectors. The flat faced inductive types are simpler to use and are more reliable. However, because of the limited bandwith or data rats performance of existing types, such as co-axial cables or screened twisted pair data links, there is a need for an effective coupler which will permit the use of fibre optic (FO) data links.

Existing fibre optic connectors are of the conductive type and have the following limitations: precise alignment is required for their make-up, any ingress of water around the pins during make-up may lead to rapid failure, only a limited number of make and breaks is possible, thus !leading to limited life and, subsea mating is difficult, particularly remote subsea mating.

We have now devised an inductive coupler which eliminates the disadvantages of the conductive type.

SUMMARY OF THE INVENTION

Thus according to the present invention there is provided a fibre optic data coupler comprising:

(a) a fibre optic data link input module comprising an input connector for a fibre optic connected to a fibre optic receiver, preferably equipped with automatic gain control, for providing a digital electrical output signal corresponding to the fibre optic signal, (b) a coupler drive module for converting the digital electrical output signal to an analogue drive signal for input to an inductive coupler, (c) an inductive coupler unit comprising an inlet element for receiving the analogue drive signal and an outlet element for transmitting an induced analogue drive signal corresponding to the input signal, (d) a coupler output module , preferably equipped with automatic gain control, for converting the induced analogue drive signal to a digital electrical output signal for input to a fibre optic data link output module, and (e) a fibre optic data link output module comprising a fibre optic transmitter module, preferably equipped with automatic gain control, for providing a fibre optic signal corresponding to the digital electrical input signal, connected to a connector for a fibre optic.

DETAILED DESCRIPTION OF THE INVENTION

Figure 1:
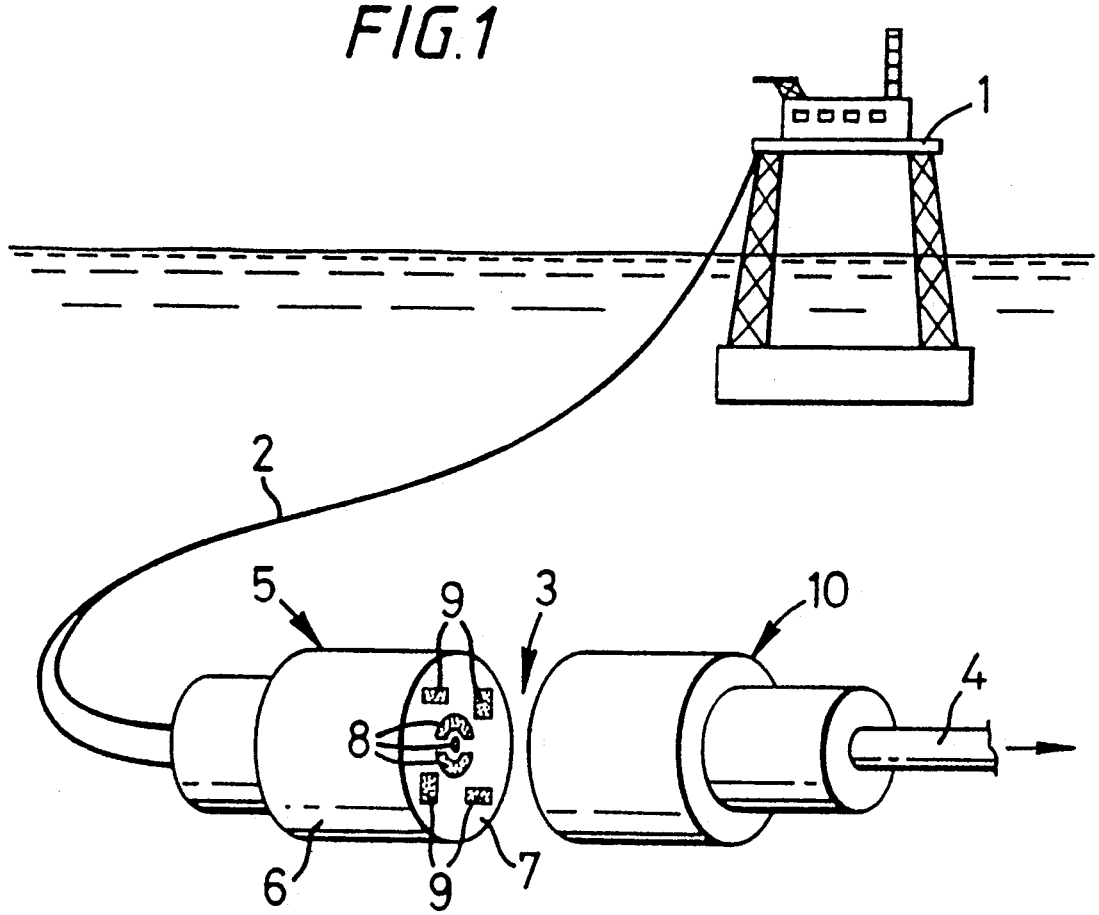
FIG. 1 shows a system for transmitting data and power from a production platform 1 to a subsea installation.

(a) The fibre optic data link input module

There will normally be one optical fibre per data channel. Data is assumed to be unidirectional on the fibre and at a single optical wavelength. (If wavelength multiplexed or bidirectional optical data is to be handled, then appropriate demultiplexing to an array of individual couplers may be required).

For short data links of a few km or less, a number of fibre types are suitable. Current fibre standards, expressed as core/cladding diameters in microns are: 50/125,62.5/125 and 85/125 graded index fibres, 100/140 semi-graded index fibres, and 200/250 or 200/300 step index fibres. Any of these will give a distance: bandwidth product of 50 MHz.km or greater.

The FO receiver can be an AC coupled photodiode with an amplifier, followed by a Schmidt trigger form of level detection to give TTL (Transistor-transitor logic) level binary output. Various commercial receivers are available incorporating these functions.

(b) The coupler drive module

There are two primary considerations in respect of the coupler drive module,

The first is the achievable frequency response in the inductive coupler. This can be broad response, from 10's of Hz to a few MHz, with a peak coupling efficiency in the 10's of kHz to 100's of kHz region. Alternatively if the drive frequency is known, the drive stage output impedance together with the coupler inductance, can be tailored to give drive resonance at the frequency of operation. If two drive frequencies are employed, then two coil windings can be employed, to give two drive resonance frequencies. This resonant approach, which can also be employed in the inductive coupler output stage, can significantly improve coupler efficiency and noise immunity.

The second consideration is the drive waveform. Since an inductive coupler has zero coupling efficiency at DC, it is not possible merely to employ a drive stage following the digital waveform. '1' or '0' levels will not couple adequately through the coupler. Ideally, the drive waveform should be sinusoidal and of constant amplitude.

If a data '1' were represented by the presence of a sinusoid, and a data '0' by its absence, then two problems arise. The first is the amplitude transients associated with a '0' to '1' or '1' to '0' transmission; such transients are undesirable and can constitute a noise source. The second problem is that it is not possible to distinguish between an '0' data level, and a disconnected coupler. For these reasons, it is common data link practice to employ either 'Frequency Shift Keying' (FSK) or 'Differential Phase-Shift Keying' (DPSK). In FSK, '1's and '0's are represented by two different frequencies. In DPSK, '1's and '0's are represented by the same frequency but (typically) with a 180° phase shift at the data transitions. In either instance, the failure of a data coupling can now be detected.

Standard modem chips are available which can perform the FSK or DPSK function; most operate at a maximum of 2.4 kbit/s and are for telecom applications. More recently higher data rate modem chips have become available for Local Area Network (LAN) applications.

The chip output should be interfaced to the inductive coupler via an amplifier, eg a high power buffer, for increasing the strength of the signal.

The required output will generally be of the order of 10VA.

(c) The inductive coupler unit

This may be a coaxial ferrite coupler and should be optimized for the highest frequency response for coupler gaps of 0 to 5 mm.

Each coupler element preferably comprises an outer sheath, a filler, eg epoxy resin, and coaxial ferrite contacts.

(d) The coupler output module

The signal from the coupler output coil should be amplified to suitable levels for the frequency discriminator or decoder input. The FSK (or DPSK) signal is best decoded to a binary signal either by a standard modem chip, or by a phase locked loop form of frequency discriminator, since these should give higher signal to noise ratio than simple frequency filtering. In order to give a bit error rate (BER) based on noise statistics of 1 in $10^{10}$, a signal to noise ratio (SNR) of 22 dB is required. It may be preferable to employ a standard modem chip; these are available with input acoustic gain control (AGC) dynamic ranges of up to 30dB.

The binary output of the frequency discriminator is then interfaced to a transmitter which may be a standard TTL input FO transmitter.

(e) The fibre optic data link output module

This may comprise a light emitting diode.

Optical fibres can easily and cost effectively be incorporated in power cables, thus the fiber optic data link will generally be used in conjunction with an AC power cable which will also have a power inductive coupler unit corresponding to the data inductive coupler unit. The power and data links will generally be incorporated in the same elements, each element preferably comprising an outer sheath, a filler, eg epoxy resin, co-axial ferrite contacts for the data link, and non-coaxial ferrite contacts for the power link.

When this is the case in situ power generation for the coupler can be by transformer coupling off the power lines followed by rectification and stabilization. In a fully developed system it may be desirable to incorporate trickle charged rechargeable batteries on either side of the coupler in order to ensure data continuity in the event of a power failure.

If no power cable is associated with the data link then it will be necessary to provide an alternative power source for the fibre optic data link coupler, eg a long life battery.

The system is capable of handling a large amount of data in real time, eg, live video for subsea complexes,
control and monitor of subsea multi-phase pumps,
control and monitor of subsea processing, and
interference free data links for unmanned platforms.

Typical control functions include the remote control of Christmas tree valves, manifold valves, downhole safety valves and chemical injection systems.

Typical monitoring functions include gathering data from sensors, eg., downhole sensors for monitoring pressure, temperature and flowrate at the well head,
Christmas tree sensors for monitoring valve status, sand detection pollution, choke and pipeline tools status, flowrate, water monitors, etc,
manifold sensors for monitoring valve and pipeline status, hydrocarbons, pollution, pressure, temperature, etc, and
riser base sensors for determining structural behaviour.

A particular advantage of the system is that it remains effective for connector face separation at 5 mm or greater and can tolerate connector lateral misalignment at 5 mm or greater.

It can act as an optical repeater module.

Figure 2A:
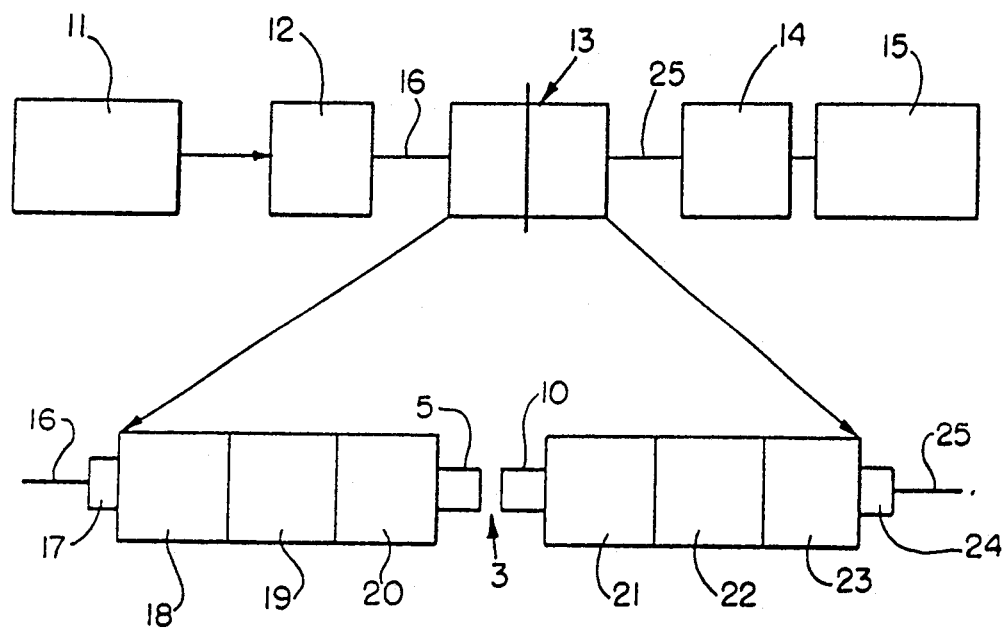
FIG. 2A shows a fiber optic data coupler according to the present invention.
Figure 2B:
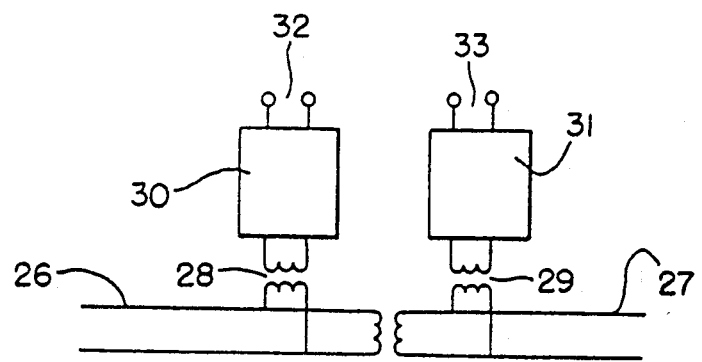
FIG. 2B shows an arrangement which supplies power to the data coupler.

The invention is illustrated with reference to FIGS. 1 and 2 of the accompanying drawings wherein FIG. 1 is a schematic view of a combined power and data coupler and FIG. 2A and FIG. 2B are block diagrams of the data coupler section and the power coupler section.

FIG. 1 shows a system for transmitting data and power from a production platform 1 to a subsea installation (not shown) by way of a power and optical fibre inlet cable 2, a power and data coupler shown schematically at 3 and a power and optical fibre outlet cable 4.

The inlet section 5 of the coupler includes an outer case 6, an epoxy filler 7, concentric ferrite faces g for the data coupler section and non-concentric ferrite faces 9 for the power coupler section.

The outlet section 10 is similar and contains matching faces.

With reference to FIG. 2A and FIG. 2B, data from a data generator 11 is transmitted by a fibre optic transmitter 12 to a data coupler 13 and thence to a fibre optic receiver 14 and a data receiver 15.

The data coupler 13 is shown in more detail immediately below.

An input fibre optic 16 is connected to the connector 17 of a fibre optic receiver 18 containing a photodiode for converting the optical signal to an electrical signal and being connected to an amplifier and a Schmidt trigger form of level detection to give a TTL level binary output.

The binary output is then fed to a coder 19 containing a modem chip capable of performing an FSK or DPSK function and thence to an amplifier 20.

The amplified signal is then fed to the inlet section 5 of the inductive coupler unit 3 (see FIG. 1) where it induces a current in the outlet section 10 by means of the concentric ferrite faces 8 in the inlet section 5 and the corresponding faces in the outlet section 10.

The outlet section 10 is connected to an amplifier 21 and the amplified signal is fed to a decoder 22 containing a modem chip capable of performing an FSK or DPSK function and thence to a LED 23 acting as a fibre optic transmitter for converting the electrical signal to an optical signal. The LED 23 is connected to a connector 24 which connects with an output fibre optic 25.

An AC power inlet cable 26 is associated with the fibre optic 16 and fed to the inlet section 5 of the inductive coupler where it induces a current in the outlet section 10 by means of the non-concentric ferrite faces 9 in the inlet section 5 and the corresponding faces in the outlet section 10. Current leaves by power outlet cable 27.

Power to supply the data coupler 13 is tapped (See FIG. 2B) from power cables 26 and 27 by inductive couplers 28 and 29 and passed to rectifier and stabilizer 30 and rectifier and stabilizer 31 from which it emerges at DC outlets 32 and 33 to power inlet section 5 and outlet section 10, respectively, of the data coupler.

I claim

1. A fibre optic data coupler comprising:
  (a) a fibre optic data link input module comprising an input connector for a fibre optic connected to a fibre optic receiver for providing a digital electrical output signal corresponding to the fibre optic signal, (b) a coupler drive module for converting the digital electrical output signal to an analogue drive signal for input to an inductive coupler, (c) an inductive coupler unit comprising an inlet element for receiving the analogue drive signal and an outlet element for transmitting an induced analogue drive signal, corresponding to the input signal, (d) a coupler output module for converting the induced analogue drive signal to a digital electrical output signal for input to a fibre optic data link output module, and (e) a fibre optic data link output module comprising a fibre optic transmitter module, for providing a fibre optic signal corresponding to the digital electrical input signal, connected to a connector for a fibre optic.

2. A fibre optic data coupler according to claim 1 wherein the fibre optic receiver comprises a photodiode.

3. A fibre optic data coupler according to claim 1 wherein the coupler drive module comprises a coder connected to an amplifier.

4. A fibre optic data coupler according to claim 3 wherein the coder is a modem chip capable of performing an FSK or DPSK function.

5. A fibre optic data coupler according to claim 1 wherein the inductive coupler unit comprises a coaxial ferrite element as input and a coaxial ferrite element as output.

6. A fibre optic data coupler according to claim 1 wherein the coupler output module comprises an amplifier and a decoder.

7. A fibre optic data coupler according to claim 6 wherein the decoder is a modem chip capable of performing an FSK or DPSK function.

8. A fibre optic data coupler according to claim 1 wherein the fibre optic data link output module comprises a light emitting diode.

9. A fibre optic data coupler according to claim 1 associated with a power cable inductive coupler.

10. A fibre optic data coupler and power cable inductive coupler according to claim 9 wherein power for the fibre optic data coupler is generated in situ by transformer coupling off the power lines followed by rectification and stabilization.

* * * * *